US005990909A

United States Patent [19]

Kwak

[11] Patent Number: 5,990,909

[45] Date of Patent: Nov. 23, 1999

[54] METHOD AND APPARATUS FOR DRAWING GRAPHICS IN A GRAPHICS CONTROLLER OF A MULTIMEDIA DATA PROCESSING AND DISPLAY SYSTEM

[75] Inventor: Jong-Taek Kwak, Yongin, Rep. of Korea

[73] Assignee: Samsung Electronics, Co., Ltd., Suwon, Rep. of Korea

[21] Appl. No.: 08/948,395

[22] Filed: Oct. 10, 1997

[30] Foreign Application Priority Data

Oct. 10, 1909 [KR] Rep. of Korea ...................... 96-45151

[51] Int. Cl.[6] ...................................................... G06F 15/16

[52] U.S. Cl. ............................................ 345/503; 345/441

[58] Field of Search ..................................... 345/418, 441, 345/442, 443, 501–503, 521, 522, 513, 516, 203

[56] References Cited

U.S. PATENT DOCUMENTS 5,163,129 11/1992 Donato et al. .......................... 345/443
5,303,321 4/1994 Peaslee et al. .......................... 345/443
5,581,673 12/1996 Kikuchi .................................. 345/443
5,613,053 3/1997 Albers et al. ........................... 345/443
5,613,054 3/1997 Albers et al. ........................... 345/443
5,666,520 9/1997 Fujita et al. ............................ 345/513
5,801,711 9/1998 Koss et al. .............................. 345/441
5,864,639 1/1999 Chao ..................................... 345/441

*Primary Examiner*—U. Chauhan
*Attorney, Agent, or Firm*—Marger Johnson & McCollom, P.C.

[57] ABSTRACT

A method for drawing graphics is carried out in a graphics processing and display system. The system has a display unit, a host for generating graphics data defining graphics images to be displayed on the display, a graphics controller for receiving information from the host and controlling graphics to be displayed, a frame buffer memory for storing graphics data, an index register for receiving an index value from the host and a coordinate register for storing a coordinate value which is obtained by the graphics controller. With the method, when a line graphics is draw, only information regarding two coordinates are used in the graphics controller by incrementing the index value by an increase which is specified according to the selected object-type. When a triangle graphics is drawn, only information regarding three coordinates are used in the graphics controller.

14 Claims, 3 Drawing Sheets

| Object-Type | The Number Of Coordinates | Graphic On Screen |
|---|---|---|
| Point | 1 |   |
| Line | 2 |   |
| Triangle | 3 |   |
| Rectangle | 2 |   |
| Quadrilateral | 4 |   |

METHOD AND APPARATUS FOR DRAWING GRAPHICS IN A GRAPHICS CONTROLLER OF A MULTIMEDIA DATA PROCESSING AND DISPLAY SYSTEM

BACKGROUND OF THE INVENTION

1. Field of the Invention

The present invention relates to a method for drawing graphics at high speed in a graphic controller which is used in a multimedia data processing and display system.

The present application is based on Korean Patent Application No. 96-45151 which is incorporated herein by reference for all purposes.

2. Description of the Related Art

In general, graphic controllers having graphics accelerators are capable of drawing a variety of graphics, such as point, line, triangle, rectangle and quadrilateral, which can be implemented in hardware. Each of such graphics requires at most four coordinates which can be represented by four points on screen.

Also, so as to draw each graphics on screen, four write commands and data corresponding thereto must be provided from a host to a graphic controller. This is because each coordinate so designated requires the execution of a write command of data to the controller to draw the graphics on screen.

When drawing graphics on screen, the graphic controller receives four coordinates from the host, but it uses only one coordinate thereof in case of a point, only two coordinates thereof in the case of a line or a rectangle, and only three coordinates in the case of a triangle. Since the graphic controller must then execute command cycles which are caused by unnecessary coordinates, the graphics processing speed is not optimized.

Accordingly, there rises an undesired problem that performance of the graphic controller becomes relatively low.

SUMMARY OF THE INVENTION

The present invention is intended to solve the problem, and it is an object of the invention to provide a method for drawing graphics at high speed in a graphics controller in which write cycles for designating coordinates of the graphics are efficiently executed.

It is also an object of the present invention to provide a method for drawing graphics at high speed in a graphic controller in which only information regarding two coordinates are used in drawing a line and only information regarding three coordinates are used in drawing a triangle.

According to an aspect of the invention, a method for drawing graphics is carried out in a graphics processing and display system which has a display unit, a host for generating graphics data defining graphics images to be displayed on the display, a graphic controller for receiving information from the host and controlling graphics to be displayed, a frame buffer memory for storing graphics data, an index register for receiving an index value from the host and a coordinate register for storing a coordinate value which is obtained by the graphic controller. The method comprises the steps of storing the index value in the index register; receiving the information from the host, said information including a shortened address signal and a data signal corresponding to the index value; selecting one of the object-types of the graphics to be drawn; determining whether or not the index value stored in the index register is equal to an initial index value; determining, if so, coordinates which are specified in accordance with the information from the host and the initial index value; selecting, if not, one of the object-types to be drawn; performing increment of the index value by an increase which is specified according to the selected object-type and performing the step of determining the coordinates; and obtaining all coordinates necessary for the selected object-type to draw a graphics.

BRIEF DESCRIPTION OF THE DRAWINGS

This invention may be understood and its objects will become apparent to those skilled in the art by reference to the accompanying drawings as follows.

DETAILED DESCRIPTION OF THE DRAWINGS

Figure 1:
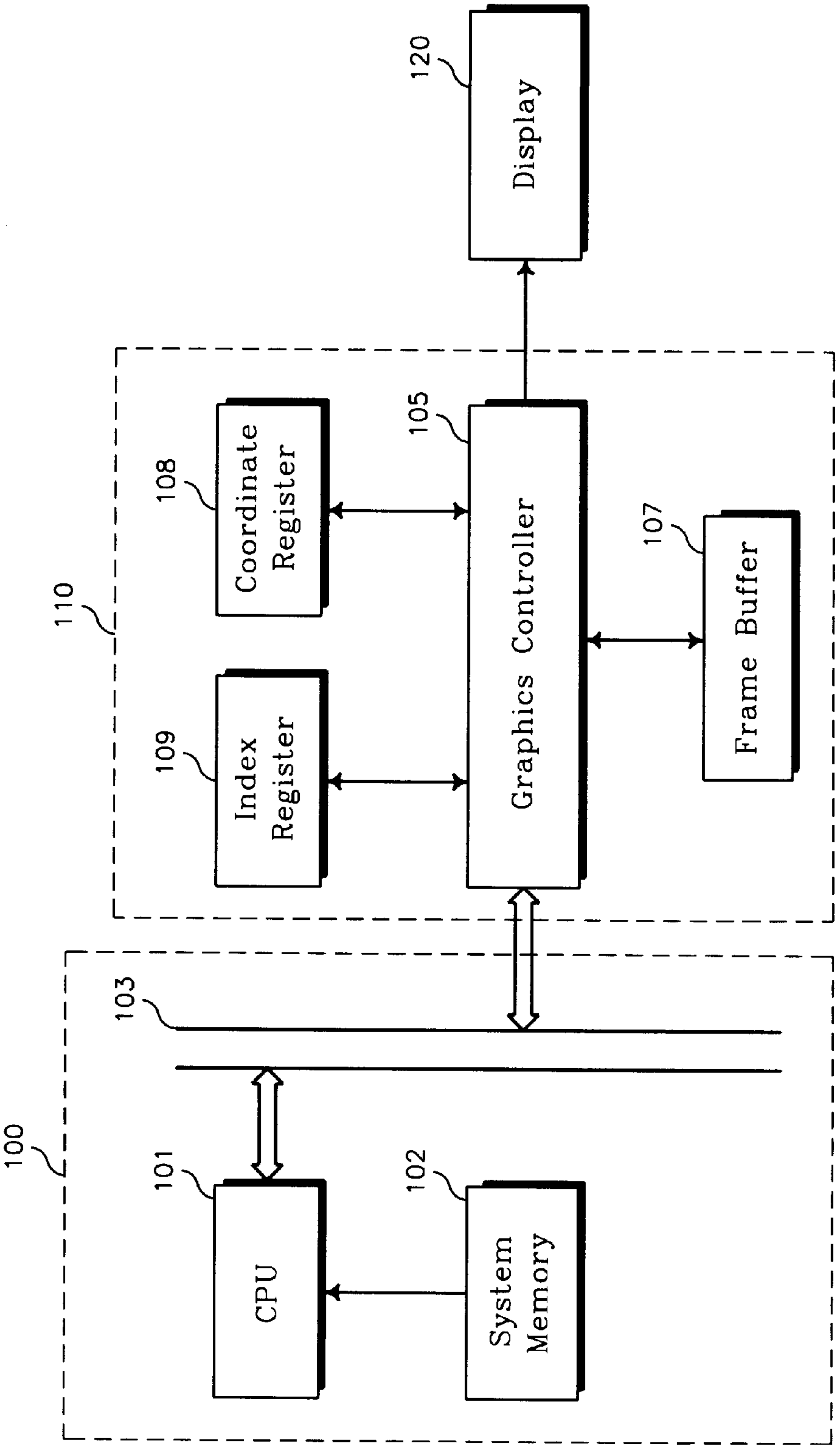
FIG. 1 is a functional block diagram of a graphics processing and display system embodying the principle of the present invention.

FIG. 1 is a functional block diagram of a graphics processing and display system which is broadly classified into two main parts, e.g., a graphics processing section (hereinafter, referred to as "host") 100 and a display unit 120. The host 100 is provided to process and simultaneously display on a single display screen of the display unit 120 graphics according to the principle of the present invention. The host 100 includes a central processing unit (CPU) 101 which controls the overall operation of the host 100 and generates graphics data defining graphics images to be displayed. The CPU 101 communicates with the graphic adapter 110 discussed below via a system bus 103. The CPU 101 operates in conjunction with a system memory 102 which stores graphics data. The system memory 102 may be for example random access memory (RAM), floppy disk, hard disk or other type of storage device.

A graphic controller 105 embodying the principle of the present invention is also coupled to the system bus 103. The graphic controller 105 interfaces CPU 101 with a display unit 120, a frame buffer 107, a coordinate register 108 and an index register 109. Frame buffer memory 107 provides temporary storage of the graphics data during processing prior to display on the display unit 120. The index register 109 receives an index value provided from the host 100 via the system bus 103 and is accessed when a Read/Write operation is performed. The coordinate register 108 is provided to store a coordinate value which is obtained by the graphic controller 105. According to the principle of the present invention, the graphic controller 105 is operable in optimum write cycles to draw on the display screen each graphical object-type such as point, line, triangle, rectangle and quadrilateral, and thereby graphics can be drawn at high speed.

In FIG. 1, the preferred structure for carrying out the invention is illustrated where the index and coordinate registers 108 and 109 are established outside the graphic controller 105. It is understood, however, that the registers 108 and 109 may be implemented within the graphic controller 105. Also, each of the index and coordinate registers may have a plurality of registers. In the preferred embodiment, four sets of coordinate registers are provided to store four coordinate values P0, P1, P2 and P3.

Figure 2:
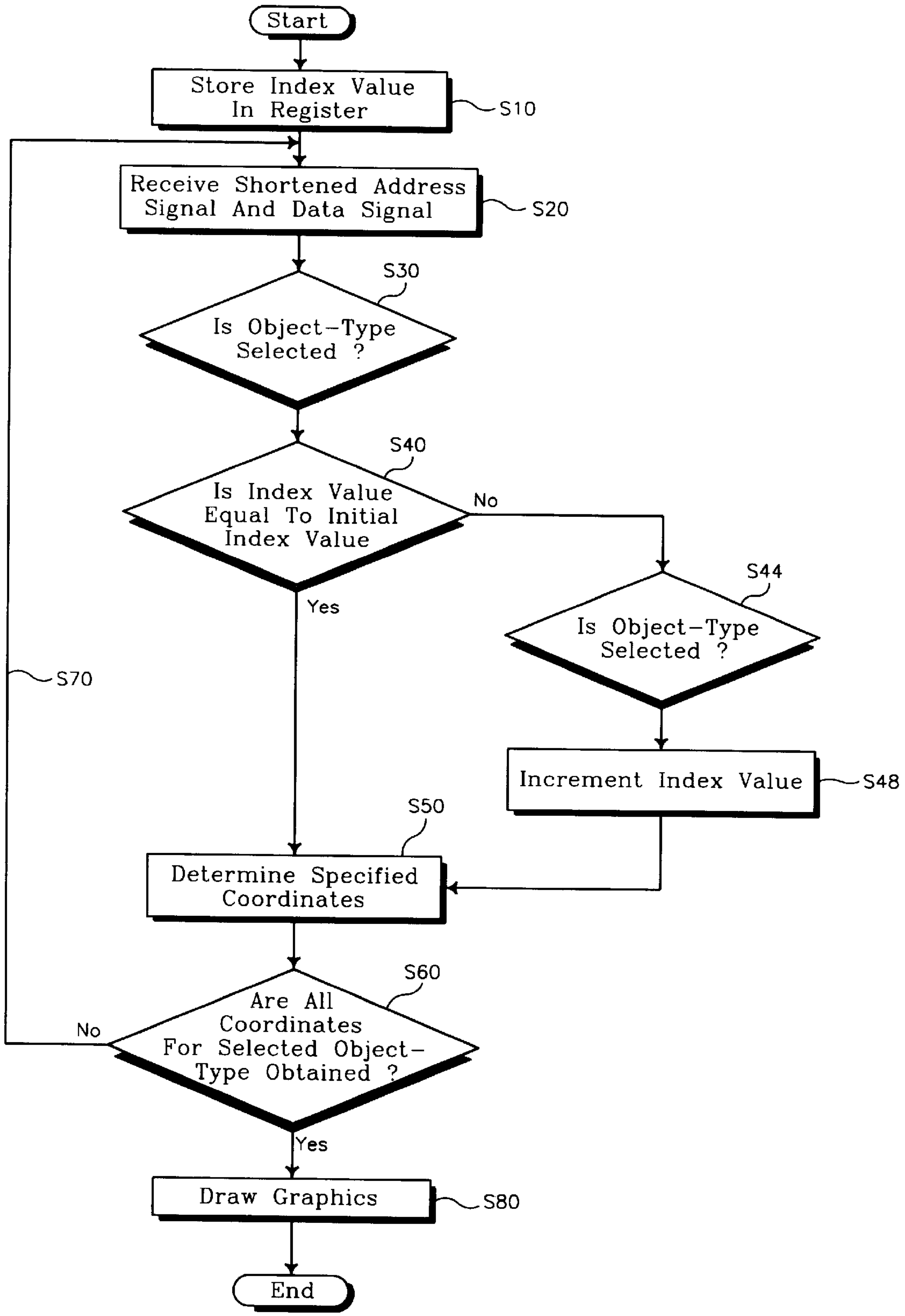
FIG. 2 is a flow chart illustrating a method for drawing graphics at high speed in the graphic controller according to the present invention.

Referring to FIG. 2, a method for drawing graphics at high speed in the graphic controller 105 according to the present invention is illustrated. The method is performed by control programs operating upon the graphic controller 105 which function according to the methods described in greater detail below.

At step S10 of FIG. 2, an index value provided from the graphic controller 105 is stored in the index register 109, and the control proceeds to step S20 wherein the graphic controller 105 receives a shortened address signal and a data signal corresponding to the index value which are applied from the host 100. Herein, the shortened address signal means three bits of, for example, 8 bits of mapped address signal as shown in Table 1 below.

TABLE 1

| Bits | 7 | 6 | 5 | 4 | 3 | 2 | 1 | 0 |
|---|---|---|---|---|---|---|---|---|
| Address | 0 | 0 | 0 | 0 | 0 | A | B | C |

wherein, if ABC is "000", the object-type indicates a point. If ABC is "001", the object-type indicates a line. If ABC is "010", the object-type indicates a triangle. If ABC is "011", the object-type indicates a rectangle. And, if ABC is "100", the object-type indicates a quadrilateral.

Also, the index value means two bits of, for example, 8 bits of mapped address signal as shown the below listed table 2.

TABLE 2

| Bits | 7 | 6 | 5 | 4 | 3 | 2 | 1 | 0 |
|---|---|---|---|---|---|---|---|---|
| Address | 0 | 0 | 0 | 0 | 0 | 0 | X | Y |

wherein, if XY is "00", the coordinate value indicates P0(x0, y0). If XY is "01", the coordinate value indicates P1(x1, y1). If XY is "10", the coordinate value indicates P2(x2, y2). If XY is "11", the coordinate value indicates P3(x3, y3).

At step 30, the controller 105 determines using the shortened 3-bit address signal which of object-types to be drawn (e.g., one of point, line, triangle, rectangle and quadrilateral) is selected, and the control proceeds to step S40 wherein it is determined whether the index value stored in the index register 109 is equal to a preset index value, i.e., an initial index value. If so, the control proceeds to step S50 wherein the graphic controller 105 determines coordinates which are specified in accordance with the data signal as well as the initial index value. If not, the control proceeds to step S44 wherein the graphic controller 105 determines using the shortened 3-bit address signal which of the object-types to be drawn is selected, as in step S30, and the control proceeds to step S48. At step S48, the index value stored in the index register 109 is incremented by the increase which is specified according to the selected object-type. The control then proceeds to step S50 to determine the coordinates.

Next, at step S60 of FIG. 2, it is determined whether the coordinates necessary for the selected object-type are obtained. If so, the control proceeds to step S80 wherein the graphic controller draws a graphics corresponding to the coordinates of the selected object-type. If not, however, the control jumps to step S20 to receive a shortened address signal and a data signal.

At step S80, if a graphics indicated by the shortened 3-bit address signal is a point, the same data signal is written in the respective coordinate registers 108. Thus, the point can be drawn on screen. Particularly, the index register 109 is provided to designate which of the four coordinate registers 108 a coordinate value is written in. The write priority of the four coordinate registers 108, for example, can be determined by setting the index register 109 with an index value, which is provided from the host 100 by virtue of designation of a user.

Figure 3:
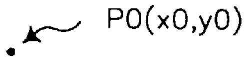
FIG. 3 is a diagram showing graphics and the number of coordinates thereof to explain the method of the present invention.
Figure 3:
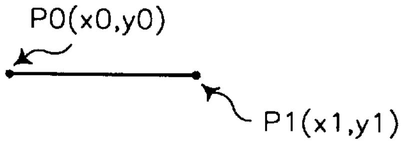
Figure 3:
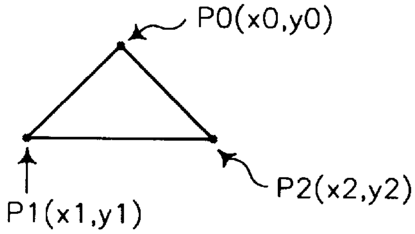
Figure 3:
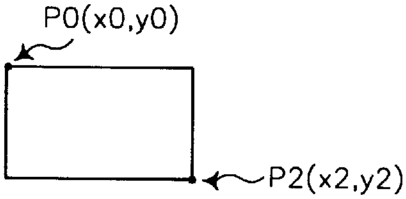
Figure 3:
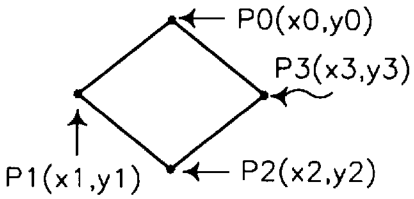

FIG. 3 shows graphics and the number of coordinates thereof to explain the graphics drawing method according to the present invention. As shown in FIG. 3, the number of coordinates necessary for drawing each graphic is as follows:

| | |
|---|---|
| Point: | one coordinate P0 (X0, Y0) |
| Line: | two coordinates, for instance, start coordinate P0 (X0, Y0) and end coordinate P1 (X1, Y1) |
| Triangle: | three coordinates, for instance, three apices P0 (X0, Y0), P1 (X1, Y1) and P2 (X2, Y2) |
| Rectangle: | two coordinates, for instance, two vertices P0 (X0, Y0) and P0 (X0, Y0) facing each other |
| Quadrilateral: | four coordinates P0 (X0, Y0), P1 (X1, Y1), P2 (X2, Y2) and P3 (X3, Y3) |

As described above, each graphics can be drawn on screen by setting the coordinate registers 108 with the coordinates necessary only for the graphics, and thus minimum drawing commands can be used to draw the graphics. According to the graphic drawing method of the present invention, in order to draw a graphics on screen, only the drawing commands corresponding to the number of the coordinates necessary for the graphics are provided to the graphic controller 105.

Hereinafter, the method for drawing graphics according to the present invention will be described in detail with reference to FIGS. 1 to 3.

If a shortened address signal and a data signal, which are represented in the following table 3, are provided from the host 100 to the graphic controller 105, a point drawing operation is carried out as mentioned below.

TABLE 3

| Shortened Address Signal | Data | |
|---|---|---|
| 0 0 0 0 0 <u>0 0 0</u> | <u>10</u>b10<br>x | <u>10</u>b10<br>y |

If the shortened address signal and the data signal as shown in table 3 are provided from the host 100 to the graphic controller 105, the graphic controller determines that the shortened address signal indicates a point type on the basis of the underlined 3 bits thereof. Since this 3-bit shortened address signal indicates a command for drawing the point, the control proceeds from step 30 of FIG. 2. Thus, the same x-coordinate value "10" (referring to Table 3) is written in all the four coordinate registers 108 whose coordinates are represented by P0 to P3. The same y-coordinate value "10" is also written in all the four coordinate registers 108. As a result, the point can be drawn on screen by providing a single write command (e.g., the shortened address and data signals) from the host to the graphic controller.

If the conventional method were used, however, four sets of write commands for selecting four coordinates (as opposed to just one in the present invention) would have been provided from a host to a graphic controller so as to draw a point.

If a shortened address signal and a data signal, which are represented in the following table 4, are provided from the host 100 to the graphic controller 105, a line drawing operation is carried out as detailed below.

TABLE 4

| Index Address Shortened Address Signal | 2' b01 (data) Data | |
|---|---|---|
| 0 0 0 0 0 0 0 0 1 | 10b000 x | 10b000 y |
| 0 0 0 0 0 0 0 0 1 | 10b111 x | 106111 y |

If the initial index value "01" as shown in table 4 is stored in the index register 109 and the shortened address signal and the data signal as also shown in table 3 are provided from the host 100 to the graphic controller 105, the graphic controller determines that the shortened address signal indicates a line type on the basis of the underlined 3 bits "001" thereof. Since this 3-bit shortened address signal indicates a command for drawing the line, the control proceeds from step 30 of FIG. 2. As a result, the line drawing operation is selected and the control proceeds to step S40 of FIG. 2 wherein it is determined whether the index value stored in the index register 109 is equal to the initial index value. Since the index value stored in the index register is the initial index value, the coordinates P1 and P2 corresponding to the index value "01" are selected. The x-coordinate value "111" and the y-coordinate value "111" (referring to Table 4) are written in the coordinate registers P1(x1, y1) and P2(x2, y2), so that the start coordinate (i.e., start point) is determined.

At this time, if all the coordinates necessary for the selected line are not obtained, the graphic controller starts to receive a new shortened address signal and a new data signal from the host. Next the control proceeds through step S30 to step S40, wherein it is determined whether or not the index value stored in the index register 109 is equal to the initial index value. At this time, since the index value is not equal to the initial index value, the control proceeds to step S44 wherein the graphic controller 105 determines using the shortened 3-bit address signal which of object-types to be drawn is selected. Since the shortened 3-bit address signal is "001" as represented in table 4, the line is selected. The index value is then incremented by the increase which is specified according to the selected line. Herein, the index value is incremented two times in case of a line or rectangle drawing operation, and one time in case of a triangle drawing operation. Thus, at step S48 of FIG. 2, the index value is incremented two times according to the selected line and is changed from "01" to "11".

Subsequently, end coordinates P0 and P3, corresponding to the incremented index value "11" are selected and the data signal "111" corresponding to the incremented index value is simultaneously written in each of the coordinates P0 and P3. As a result, the coordinate values of start point (P1, P2) and end point (P0, P3) are determined by only two drawing commands, and thus the graphic controller allows the line drawing on screen.

When a shortened address signal and a data signal, which are represented in the following table 5, are provided from the host 100 to the graphic controller 105, a rectangle drawing operation is carried out as mentioned below.

TABLE 5

| Index Address Shortened Address Signal | 2' b00 (data) Data | |
|---|---|---|
| 0 0 0 0 0 0 0 1 1 | 10b000 x | 10b000 y |
| 0 0 0 0 0 0 0 1 1 | 10b111 x | 10b111 y |

If the initial index value "00" as shown in table 5 is stored in the index register 109 and the shortened address signal and the data signal as also shown in table 5 are provided from the host 100 to the graphic controller 105, the graphic controller determines that the shortened address signal indicates a rectangle type on the basis of the underlined 3 bits "011" thereof. Since this 3-bit shortened address signal indicates a command for drawing the rectangle, the control proceeds from step 30 of FIG. 2. As a result, the rectangle drawing operation is selected and the control proceeds to step S40 of FIG. 2 wherein it is determined whether the index value stored in the index register 109 is equal to the initial index value. Since the index value stored in the index register is the initial index value, the coordinates P0 and P1 corresponding to the index value "00" are selected, and the x-coordinate value "000" and the y-coordinate value "000" (referring to Table 5) are written in the coordinate registers P0 and P1, so that one coordinate is determined.

At this time, if all the coordinates necessary for the selected rectangle are not obtained, the control proceeds to step S20 wherein the graphic controller starts to receive a new shortened address signal and a new data signal from the host. Next the control proceeds through step S30 to step S40, wherein it is determined whether or not the index value stored in the index register 109 is equal to the initial index value. At this time, since the index value is not equal to the initial index value, the control proceeds to step S44 wherein the graphic controller 105 determines using the shortened 3-bit address signal which of object-types to be drawn is selected. Since the shortened 3-bit address signal is "011" as represented in table 5, the rectangle is selected. The index value is then incremented by the increase which is specified according to the selected rectangle. Herein, the index value is incremented two times. Thus, at step S48 of FIG. 2, the index value is incremented two times according to the selected rectangle to be changed from "00" to "10".

Subsequently, the coordinates P1 and P2 corresponding to the incremented index value "10" are selected. The same data signal "111" corresponding to the incremented index value is simultaneously written as the x-coordinate value in the respective coordinates P1 and P2, and the same data signal as the y-coordinate value in the respective coordinates P2 and P3. As a result, similarly to the line drawing, the coordinate values of P0 to P3 are determined by only two drawing commands, and thus the graphic controller allows the rectangle drawing on screen.

Finally, when a shortened address signal and a data signal, which are represented in the following table 6, are provided from the host 100 to the graphic controller 105, a triangle drawing operation is carried out as mentioned below.

TABLE 6

| Index Address Shortened Address Signal | Data 2' b00 (data) | |
|---|---|---|
| 0 0 0 0 0 0 0 1 0 | 10b000 x | 10b000 y |
| 0 0 0 0 0 0 0 1 0 | 10b011 x | 10b011 y |
| 0 0 0 0 0 0 0 1 0 | 10b111 x | 10b111 y |

If the initial index value "00" as shown in table 6 is stored in the index register 109 and the shortened address signal and the data signal as also shown in table 6 are provided from the host 100 to the graphic controller 105, the graphic controller determines that the shortened address signal indicates a triangle type on the basis of the underlined 3 bits "010" thereof. Since this 3-bit shortened address signal "010" indicates a command for drawing the triangle, the control proceeds from step 30 of FIG. 2. As a result, the triangle drawing operation is selected and the control proceeds to step S40 of FIG. 2 wherein it is determined whether the index value stored in the index register 109 is equal to the initial index value. Since the index value stored in the index register is the initial index value, the coordinates P0 and P1 corresponding to the index value "00" are selected, and the x-coordinate value "000" and the y-coordinate value "000" (referring to Table 6) are written in the coordinate registers P0 and P1, so that one coordinate is determined.

If all the coordinates necessary for the selected triangle are not obtained, the control proceeds to step S20 of FIG. 2 so as to receive a new shortened address signal and a new data signal from the host. Next the control proceeds through step S30 to step S40, wherein it is determined whether or not the index value stored in the index register 109 is equal to the initial index value. Since the index value is not equal to the initial index value, the control proceeds to step S44 wherein the graphic controller 105 determines using the shortened 3-bit address signal which of object-types to be drawn is selected. Since the shortened 3-bit address signal is "010" as represented in table 6, the triangle is selected. The index value is then incremented by the increase which is specified according to the selected triangle. Herein, the index value is incremented one times. Thus, at step S48 of FIG. 2, the index value is incremented one times according to the selected triangle to be changed from "00" to "01".

Subsequently, the coordinates P1 and P2 corresponding to the incremented index value "01" are selected. The same data signal "011" corresponding to the incremented index value "01" and the y-coordinate value "011" are thus written as the x- and y-coordinate values in the respective coordinates P1 and P2.

Through steps S20 to S40, again, the index value is incremented by one time according to the selected triangle to be changed from "01" to "10". Thus, the coordinates P2 and P3 corresponding to the incremented index value "10" are selected. As a result, the same data signal "111" corresponding to the incremented index value "10" is written in the respective coordinates P2 and P3. Consequently, the x- and y-coordinate values of the respective coordinates P1 and P2 are written two times, but the finally written coordinate values are presented in the respective coordinates P1 and P2. Therefore, coordinate values corresponding to three apices of the triangle are written in P0, P1 and P3, respectively.

On the other hand, in case of drawing a quadrilateral, since four coordinate values must be written in P0 to P3, respectively, as in the conventional quadrilateral drawing method, description thereof is omitted herein.

As described above, according to a graphic drawing method of the invention, only write operations regarding two coordinates can be used in drawing a line graphics and only write operation regarding three coordinates can be used in drawing a triangle graphics. Accordingly, write cycles for designating coordinates of the graphics are be minimally executed, so that a graphic drawing operation can be performed faster.

What is claimed is:

1. A method for drawing graphics in a graphics processing and display system having a plurality of coordinate registers for storing respective coordinate values of an graphics object to be drawn, the method comprising:

receiving a shortened address signal identifying a selected graphic object-type to be drawn and coordinate data identifying the location at which the selected graphic object-type is to be displayed on the display system;

storing an initial index value;

writing the coordinate data to a coordinate register of the selected graphic object-type responsive to the index value;

determining whether all coordinates for the selected object-type are applied; and drawing the selected graphic object-type if all coordinates for the selected object-type are applied, otherwise incrementing the index value by an amount responsive to the shortened address signal and returning to the writing step.

2. The method of claim 1, wherein the step of writing the coordinate data includes writing coordinate data for a single coordinate of the selected graphic object-type to at least two coordinate registers of the graphics processing and display system.

3. The method of claim 2, wherein the graphic object-type to be drawn is selected from the group consisting of a point, a line, a triangle, a rectangle and a quadrilateral.

4. The method of claim 3, wherein if the graphic object-type to be drawn is a point, that the coordinate data is written to all coordinate registers for that object in the graphics processing and display system, thereby requiring that write operations for only one coordinate can be used in drawing a point object-type.

5. The method of claim 3, wherein if the graphic object-type to be drawn is a line or a rectangle, the amount by which the index value is incremented is two, thereby requiring that only write operations for two coordinates can be used in drawing a line or rectangle object-type.

6. The method of claim 3, wherein if the graphic object-type to be drawn is a triangle, the amount by which the index value is incremented is one, thereby requiring that only write operations for three coordinates can be used in drawing a triangle object-type.

7. A method for drawing graphics in a graphics processing and display system having a display unit, a host for generating graphics data defining graphics images to be displayed on the display, a graphic controller for receiving information from the host and controlling graphics to be displayed, a frame buffer memory for storing graphics data, an index register for receiving an index value from the host and a coordinate register for storing a coordinate value which is obtained by the graphic controller, comprising the steps of:

storing the index value in the index register;

receiving the information from the host, said information including a shortened address signal and a data signal corresponding to the index value;

selecting one of object-types of the graphics to be drawn responsive to the shortened address signal;

determining whether or not the index value stored in the index register is equal to an initial index value;

determining, if so, coordinates which are specified in accordance with the information from the host and the initial index value;

performing increment of the index value by an increase which is specified according to the selected object-type and performing the step of determining the coordinates; and obtaining all coordinates necessary for the selected object-type to draw a graphics.

8. The method as defined in claim 7 wherein, in the step of performing the increment, the index value is incremented two times in case of a line type or a rectangle type.

9. The method as defined in claim 7 wherein, in the step of performing the increment, the index value is incremented one time in case of a triangle type or a quadrilateral type.

10. A graphics processing and display system comprising:

a display unit;

a host for generating a shortened address signal identifying a selected graphic object-type to be drawn and coordinate data identifying the location at which the selected graphic object-type is to be displayed on the display unit;

a graphics controller for receiving coordinate data from the host and controlling graphics to be displayed;

a frame buffer memory for storing graphics data;

an index register for receiving an index value from the host and incrementing the index value responsive to the shortened address signal; and a coordinate register for storing a coordinate value which is obtained by the graphic controller.

11. The graphics processing and display system of claim 10, wherein the index register and coordinate register are established within the graphics controller.

12. The graphics processing and display system of claim 10, wherein the index register and coordinate register are established outside the graphics controller.

13. The graphics processing and display system of claim 10, wherein each of the index and coordinate registers having a plurality of registers.

14. The graphics processing and display system of claim 10, wherein the coordinate register includes four sets of coordinate registers to store four coordinate values.

* * * * *